US011434971B2

(12) United States Patent
Alvarez Cendoya (10) Patent No.: US 11,434,971 B2
(45) Date of Patent: Sep. 6, 2022

(54) DAMPER ASSEMBLY INCLUDING VALVE CONNECTORS HAVING ONE-WAY VALVES

(71) Applicant: DRiV Automotive Inc., Lake Forest, IL (US)

(72) Inventor: Alexander Alvarez Cendoya, Bilbao (ES)

(73) Assignee: DRiV Automotive Inc., Skokie, IL (US)

( * ) Notice: Subject to any disclaimer, the term of this patent is extended or adjusted under 35 U.S.C. 154(b) by 79 days.

(21) Appl. No.: 17/007,948

(22) Filed: Aug. 31, 2020

(65) Prior Publication Data

US 2022/0065323 A1 Mar. 3, 2022

(51) Int. Cl.
| F16F 9/06 | (2006.01) |
| F16F 9/516 | (2006.01) |
| F16F 9/34 | (2006.01) |
| F16F 9/18 | (2006.01) |

(Continued)

(52) U.S. Cl.
CPC ............. *F16F 9/516* (2013.01); *F16F 9/187* (2013.01); *F16F 9/34* (2013.01); *B60G 13/08* (2013.01); *B60G 17/08* (2013.01); *B60G 2202/24* (2013.01); *B60G 2202/25* (2013.01); *B60G 2206/41* (2013.01); *B60G 2500/11* (2013.01); *B60G 2600/182* (2013.01); *B60G 2800/16* (2013.01); *F16F 2222/12* (2013.01); *F16F 2228/066* (2013.01); *F16F 2230/18* (2013.01); *F16F 2232/08* (2013.01); *F16F 2234/02* (2013.01)

(58) Field of Classification Search
CPC ............................ B60G 17/0152; B60G 17/08

USPC .............. 188/266.6, 315, 318, 322.13, 322.2
See application file for complete search history.

(56) References Cited

U.S. PATENT DOCUMENTS 4,936,423 A * 6/1990 Karnopp ............ B60G 17/0152
137/625.47
5,588,510 A * 12/1996 Wilke ..................... F16F 9/064
188/266.6
(Continued)

FOREIGN PATENT DOCUMENTS

DE 19841857 A1 6/1999
DE 4324444 C2 11/2000
(Continued)

*Primary Examiner* — Christopher P Schwartz
(74) *Attorney, Agent, or Firm* — DRiV Automotive Inc.

(57) ABSTRACT

A damper assembly includes an outer tube and an inner tube disposed in the outer tube defining a reserve chamber. The inner tube defines an inner volume. A piston is slidably disposed in the inner tube and divides the inner volume into a rebound working chamber and a compression working chamber. A rebound valve is fluidly connected to the rebound working chamber and the reserve chamber, and a compression valve is fluidly connected to the reserve chamber and the compression working chamber. A rebound valve connector fluidly connects the rebound valve and the rebound working chamber and a compression valve connector fluidly connects the compression valve and the compression working chamber. The rebound valve connector includes a one-way valve from the reserve chamber to the rebound working chamber and the compression valve connector includes a one-way valve from the reserve chamber to the compression working chamber.

13 Claims, 5 Drawing Sheets

(51) Int. Cl.
*B60G 13/08* (2006.01)
*B60G 17/08* (2006.01)

(56) References Cited

U.S. PATENT DOCUMENTS

| | | | | |
|---|---|---|---|---|
| 5,934,422 | A * | 8/1999 | Steed | F16F 9/46 |
| | | | | 188/318 |
| 6,283,259 | B1 | 9/2001 | Nakadate | |
| 6,321,888 | B1 | 11/2001 | Reybrouck et al. | |
| 7,438,164 | B2 | 10/2008 | Groves et al. | |
| 11,118,649 | B2 * | 9/2021 | Deferme | F16F 9/3405 |
| 11,156,261 | B2 * | 10/2021 | Deferme | F16F 9/065 |
| 2005/0121268 | A1 * | 6/2005 | Groves | F16F 9/464 |
| | | | | 188/266.6 |
| 2013/0340607 | A1 * | 12/2013 | Born | E05C 17/305 |
| | | | | 92/8 |
| 2016/0281815 | A1 * | 9/2016 | Teraoka | F16F 9/061 |
| 2019/0136932 | A1 * | 5/2019 | Deferme | F16F 9/185 |

FOREIGN PATENT DOCUMENTS

| | | |
|---|---|---|
| DE | 102015209179 A1 | 11/2016 |
| GB | 2378231 B | 3/2003 |
| KR | 101756423 B1 | 7/2017 |

\* cited by examiner

DAMPER ASSEMBLY INCLUDING VALVE CONNECTORS HAVING ONE-WAY VALVES

FIELD

The present disclosure generally relates to dampers. More particularly, the present disclosure relates to a damper with external active control valves which are balanced with passive intake valves.

BACKGROUND

Dampers for vehicles are commonly included in a wide variety of vehicle segments. Some vehicles include semi-active damping that adjusts damping levels according to road conditions and vehicle dynamics. The dampers are between a body and the suspension system of the vehicle. A piston is located within the damper. The piston is connected to the vehicle body or the suspension of the vehicle through a piston rod. As the damper is compressed or extended, fluid flows between rebound and compression chambers within the damper to counteract vibrations. By adjusting the flow of damping fluid between the chambers, greater or lower damping forces may be generated.

DETAILED DESCRIPTION

With reference to the Figures, wherein like numerals indicate like parts throughout the several views, a damper assembly 10 for a vehicle 12 is generally shown. The damper assembly 10 includes an outer tube 14 and an inner tube 16 disposed in the outer tube 14 defining a reserve chamber 18 between the outer tube 14 and the inner tube 16. The inner tube 16 defines an inner volume 20. A piston 22 is slidably disposed in the inner tube 16. The piston 22 divides the inner volume 20 of the inner tube 16 into a rebound working chamber 24 and a compression working chamber 26. The damper assembly 10 includes a rebound valve 28 and a compression valve 30 each having a variable flow resistance. The rebound valve 28 is fluidly connected to the rebound working chamber 24 and the reserve chamber 18. The compression valve 30 is fluidly connected to the reserve chamber 18 and the compression working chamber 26. The damper assembly 10 includes a rebound valve connector 32 and a compression valve connector 34. The rebound valve connector 32 fluidly connects the rebound valve 28 and the rebound working chamber 24 and includes a one-way valve 36 from the reserve chamber 18 to the rebound working chamber 24. The compression valve connector 34 fluidly connects the compression valve 30 and the compression working chamber 26 and includes a one-way valve 36 from the reserve chamber 18 to the compression working chamber 26.

Advantageously, the design of the damper assembly 10 may be scaled up the damper assembly 10 including two valves, i.e., the rebound valve 28 and the compression valve 30, and may be scaled down to a single-valve damper assembly that includes a single valve instead of two valves. In the single-valve design, the single valve may have valve components in common with the rebound valve 28 and the compression valve 30. The rebound valve connector 32 and the compression valve connector 34 of the damper assembly 10 allow for these common valve components to be assembled in the damper assembly 10. Accordingly, as an example, the damper assembly 10 may be assembled on the same assembly line with a single-valve damper with a common source for the common valve components. The rebound valve connector 32 and the compression valve connector 34 allows the design to be scaled up from the single-valve damper assembly 10 to the two-valve design of the damper assembly 10.

Figure 1:
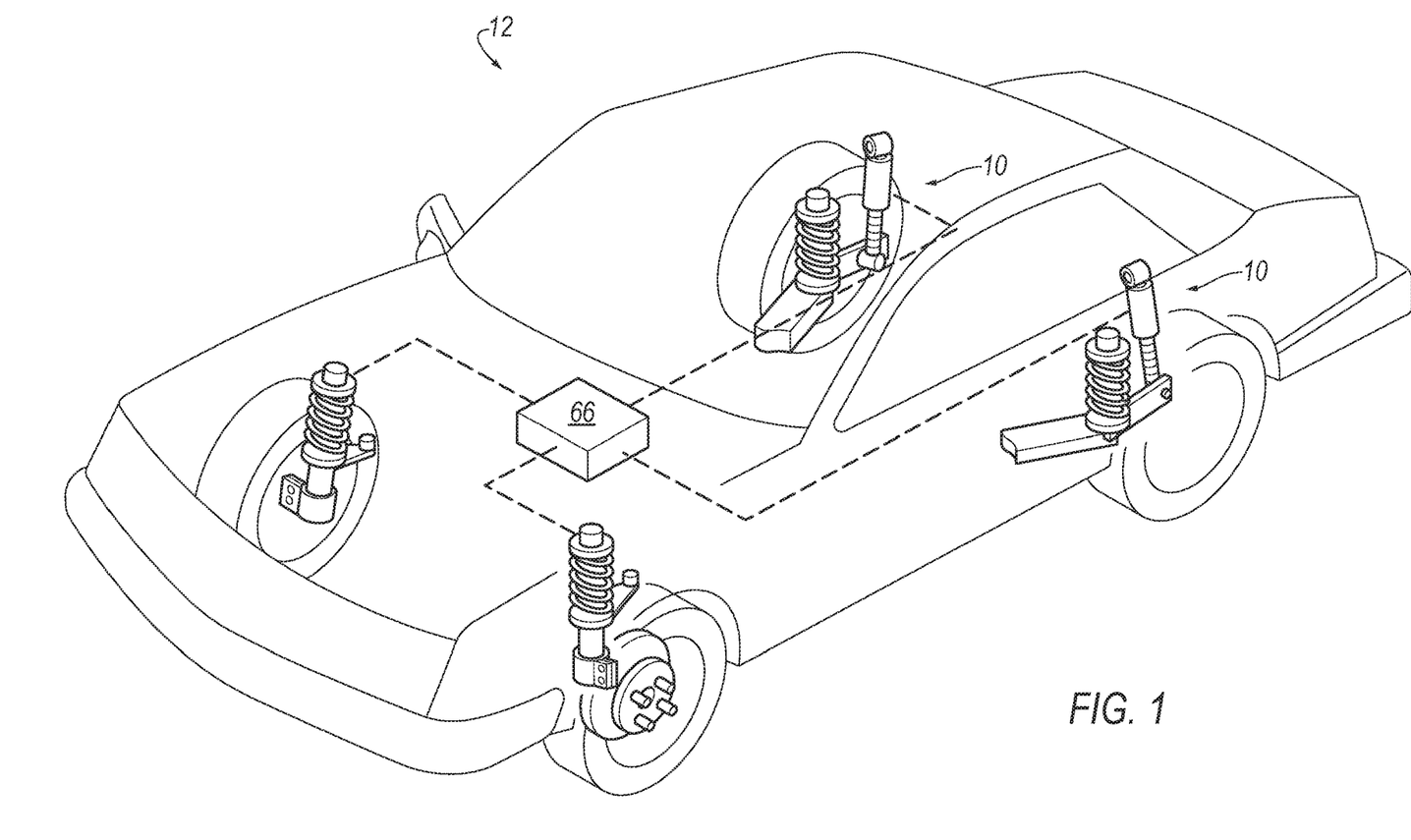
FIG. 1 is a schematic illustration of a vehicle including a suspension system having a plurality of damper assemblies.

The damper assembly 10 continuously adjusts damping levels according to road conditions and vehicle dynamics. FIG. 1 shows an example of the vehicle 12 having a suspension system and a body. Suspension system may include more than one damper assembly 10. Each damper assembly 10 may be coupled with a coil spring. The damper assembly 10 is semi-active with damping levels controlled by an electronic control unit (ECU) 66. The ECU 66 receives information (e.g., acceleration, speed, pitch, yaw, roll, steering, braking) from sensors (not shown) at various locations on the vehicle 12 to make independent adjustments to each damper assembly 10.

Figure 2:
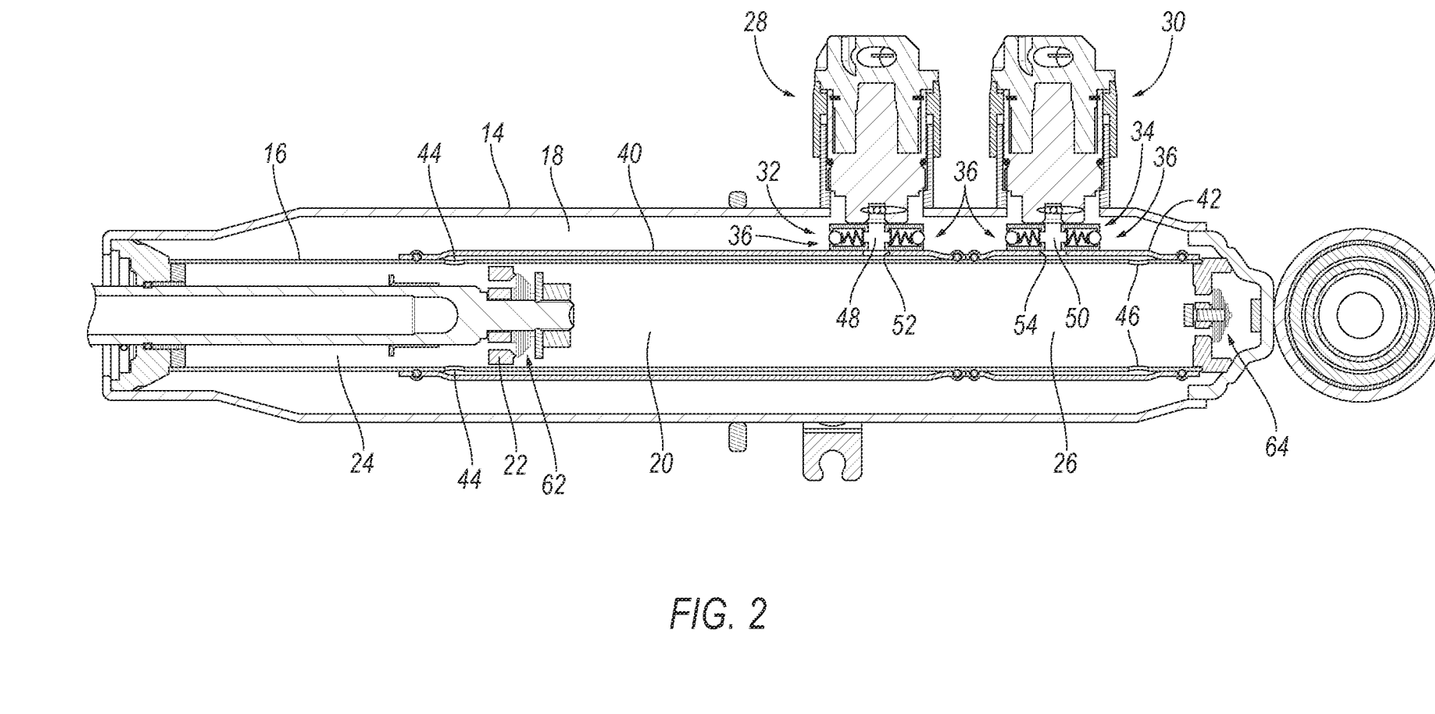
FIG. 2 is a cross-sectional view of the damper assembly.

With reference to FIG. 2, the damper assembly 10 includes the outer tube 14 and the inner tube 16 disposed in the outer tube 14. The inner tube 16 and the outer tube 14 may be concentric. The outer tube 14 and the inner tube 16 define the reserve chamber 18 between the outer tube 14 and the inner tube 16. The reserve chamber 18 may be annular and continuous about the inner tube 16. The inner tube 16 defines the inner volume 20, which is selectively in communication with the reserve chamber 18, as discussed further below. The inner volume 20 and the reserve chamber 18 contain a fluid, e.g., a liquid such as hydraulic oil.

Figure 4:
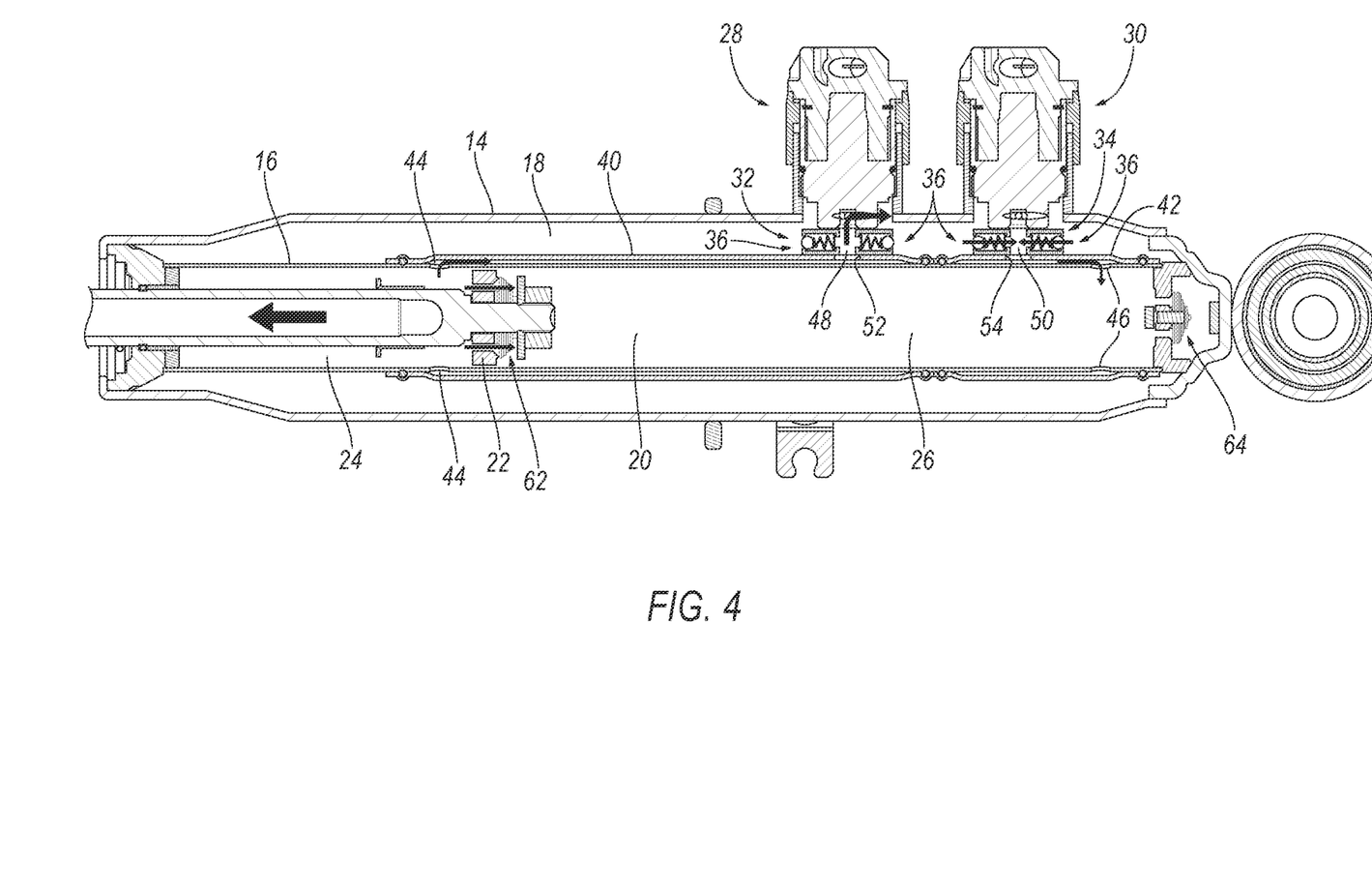
FIG. 4 is a cross-sectional view of the damper assembly showing fluid flow during a rebound stroke.
Figure 5:
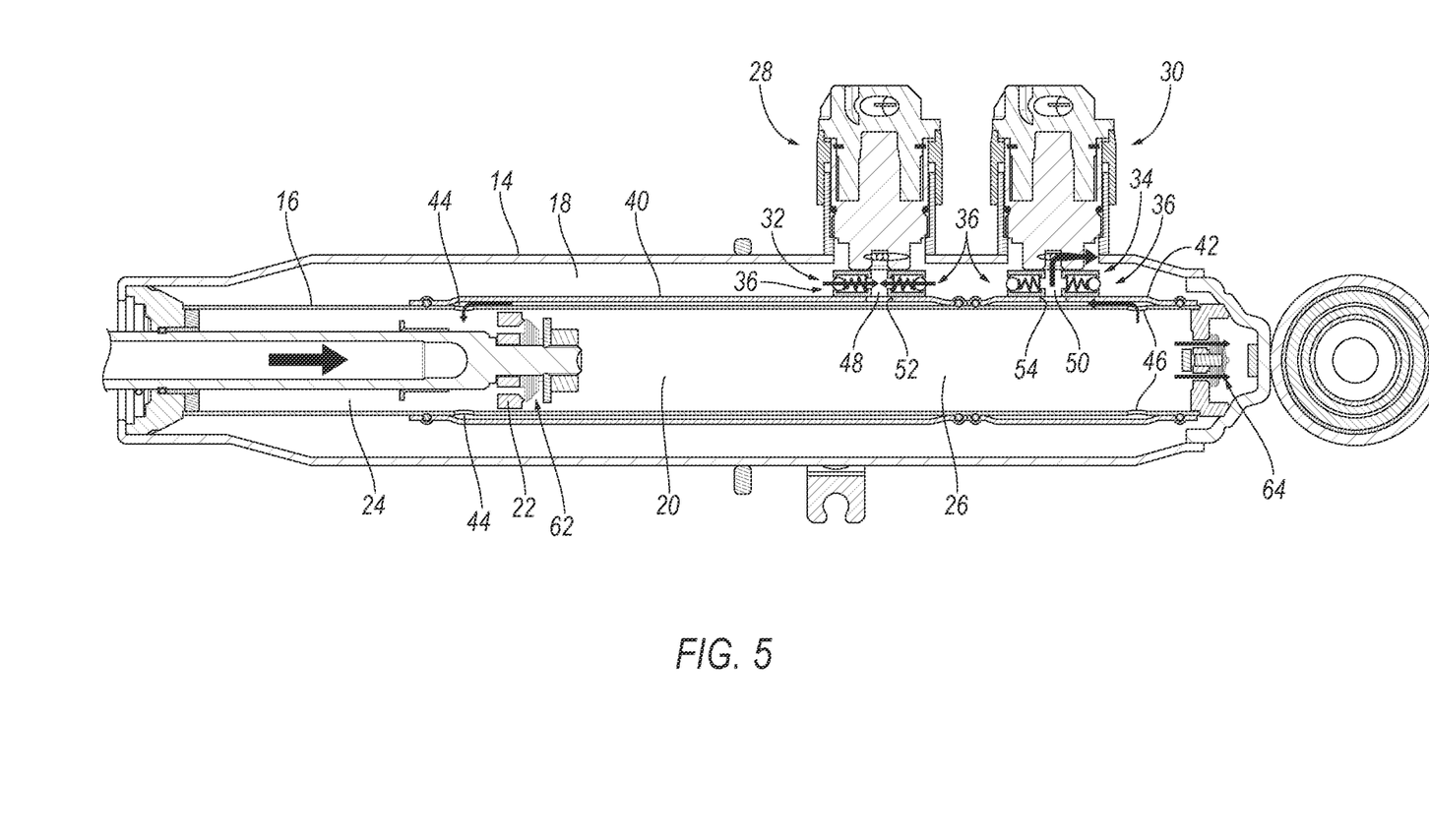
FIG. 5 is a cross-sectional view of the damper assembly showing fluid flow during a compression stroke.

The dampener assembly includes a piston assembly including a rod (not numbered) and a piston 22. The piston 22 is contained in the inner tube 16 and the rod extends externally of outer tube 14 through a rod guide assembly (not numbered). The piston 22 is slidably disposed in the inner tube 16. The piston 22 divides the inner volume 20 of the inner tube 16 into the rebound working chamber 24 and the compression working chamber 26. The fluid in the inner volume 20 flows between the rebound working chamber 24 and the compression working chamber 26. During rebound of the damper assembly 10, as shown in FIG. 4, the piston 22 compresses fluid in the rebound working chamber 24 and fluid flows from the rebound working chamber 24 to the compression working chamber 26. During compression of the damper assembly 10, as shown in FIG. 5, the piston 22 compresses fluid in the compression working chamber 26 and fluid flows from the compression working chamber 26 to the rebound working chamber 24.

With reference to FIG. 2, as set forth above, the rebound valve 28 is fluidly connected to the rebound working chamber 24 and the reserve chamber 18. The compression valve 30 is fluidly connected to the reserve chamber 18 and the compression working chamber 26. Specifically, the damper assembly 10 includes a third tube 40 and a fourth tube 42 fixed to the inner tube 16 between the inner tube 16 and the outer tube 14. The third tube 40 and the fourth tube 42 may be referred to as "transfer tubes 40, 42." The third tube 40 fluidly connects the rebound working chamber 24 and the rebound valve 28. The fourth tube 42 fluidly connects the compression working chamber 26 and the compression valve 30. Specifically, the third tube 40 is fluidly connected to the rebound working chamber 24 and the chamber of the rebound valve connector 32, and the fourth tube 42 is fluidly connected to the compression working chamber 26 and the compression valve connector 34.

The third tube 40 and the fourth tube 42 are tubular and extend circumferentially around the inner tube 16, e.g., concentric with the inner tube 16. The third tube 40 and the fourth tube 42 are sealed to the inner tube 16 and define a flow path between the inner tube 16 and the transfer ring. The flow paths may be annular and continuous about the inner tube 16. The flow path of the third tube 40 allows fluid to flow between the rebound working chamber 24 and the rebound valve connector 32. The flow path of the fourth tube 42 allows fluid to flow between the compression working chamber 26 and the compression valve connector 34.

The third tube 40 defines the flow path from the rebound working chamber 24 to the chamber of the rebound valve connector 32. The fourth tube 42 defines the flow path from the compression working chamber 26 to the chamber of the compression valve connector 34. The flow path of the third tube 40 is in fluid communication with the rebound working chamber 24 and the flow path of the fourth tube 42 is in fluid communication with the compression working chamber 26. For example, the inner tube 16 may define an orifice 44 from the rebound working chamber 24 to the flow path of the third tube 40 and the inner tube 16 may define an orifice 46 from the compression working chamber 26 to the flow path of the fourth tube 42. The inner tube 16 may have any suitable number of orifices 44 and orifices 46, e.g., two orifices 44 and two orifices 46 are shown in the example in the Figures. The orifices 44, 46 each define a contact area that represents the two-dimensional area through which fluid flows.

The flow path of the third tube 40 is in fluid communication with a chamber 48 of the rebound valve connector 32 and the flow path of the fourth tube 42 is in fluid communication with a chamber 50 of the compression valve connector 34. For example, the third tube 40 may define an orifice 52 from the flow path of the third tube 40 to the chamber 48 of the rebound valve connector 32 and the fourth tube 42 may define an orifice 54 from the flow path of the fourth tube 42 to the chamber 50 of the compression valve connector 34. The third tube 40 and the fourth tube 42 may have any suitable number of orifices 52 and orifices 54, respectively, e.g., two orifices 52 and two orifices 54 are shown in the example in the Figures. The orifices 52, 54 each define a contact area that represents the two-dimensional area through which fluid flows.

With continued reference to FIG. 2, the rebound valve 28 and the compression valve 30 are mounted to the inner tube 16 and may extend through the outer tube 14. As described further below, the rebound valve 28 controls flow of fluid from the rebound working chamber 24 to the reserve chamber 18 during rebound of the damper assembly 10, and the compression valve 30 controls flow of fluid from the compression working chamber 26 to the reserve chamber 18 during compression of the damper assembly 10. The rebound valve 28 and the compression valve 30 may have identical structural components. As another example, the rebound valve 28 and the compression valve 30 may be different. Each of the rebound valve 28 and the compression valve 30 may be one-way valves.

With continued reference to FIG. 2, the rebound valve 28 is between the chamber 48 of the rebound valve connector 32 and the reserve chamber 18. The rebound valve 28 is fluidly connected to the rebound working chamber 24 through the orifices 44, 52, the flow path of the third tube 40, and the chamber 48 of the rebound valve connector 32. The compression valve 30 is between the chamber 50 of the compression valve connector 34 and the reserve chamber 18. The compression valve 30 is fluidly connected to the compression working chamber 26 through the orifices 46, 54, the flow path of the fourth tube 42, and the chamber 50 of the rebound valve connector 32.

The rebound valve 28 is mounted to the third tube 40 and the compression valve 30 is mounted to the fourth tube 42. In the example shown in FIG. 2, the rebound valve 28 is mounted directly to the rebound valve connector 32, i.e., without any components therebetween, and the rebound valve connector 32 is mounted directly to the inner tube 16, i.e., without any components therebetween. As another example, the damper assembly 10 may include additional components between the rebound valve 28 and the rebound valve connector 32 and/or between the rebound valve connector 32 and the inner tube 16. In the example in FIG. 2, the compression valve 30 is mounted directly to the compression valve connector 34, i.e., without any components therebetween, and the compression valve connector 34 is mounted directly to the inner tube 16, i.e., without any components therebetween. As another example, the damper assembly 10 may include additional components between the compression valve 30 and the compression valve connector 34 and/or between the compression valve connector 34 and the inner tube 16.

During rebound of the damper assembly 10 as shown in FIG. 4, the rebound valve 28 is selectively opened, as described further below, to allow fluid to flow from the chamber 48 of the rebound valve connector 32 to the reserve chamber 18. This opens a flow path from the rebound working chamber 24 to the reserve chamber 18. During compression of the damper assembly 10 as shown in FIG. 5, the compression valve 30 is selectively opened, as described further below, to allow fluid to flow from the chamber 50 of the compression valve connector 34 to the reserve chamber 18.

The rebound valve 28 and the compression valve 30 each have a variable flow resistance. Specifically, the rebound valve 28 and the compression valve 30 are each configured to vary flow rate through the valve 28, 30. In other words, the rebound valve 28 and the compression valve 30 may open and close and may adjust the flow rate to varying levels when opened. The variable flow resistance may be accomplished by adjustment of the size of the flow path through the valve 28, 30.

The variable flow resistance may be adjusted based on conditions to vary dampening by the dampener assembly. The rebound valve 28 and the compression valve 30 may each include a solenoid operably controlled by the ECU 66. In such an example, the rebound valve 28 and the compression valve 30 may be electro-hydraulic valves. The ECU 66 receives information (e.g., acceleration, speed, pitch, yaw, roll, steering, braking) from sensors (not shown) at various locations on the vehicle 12 to make independent adjustments to valve 28, 30 of each damper assembly 10 to change the damping rate to adapt to road conditions. For example, the ECU 66 may cause the valves 28, 30 to restrict fluid flow through the reserve chamber 18 to provide a harder ride or provide less restriction through the reserve chamber 18 to provide a softer ride.

As set forth above, the rebound valve connector 32 fluidly connects the rebound valve 28 and the rebound working chamber 24 and the compression valve connector 34 fluidly connects the compression valve 30 and the compression working chamber 26. Specifically, the chamber 48 of the rebound valve connector 32 extends through the rebound valve connector 32 and fluidly connects the rebound valve 28 and the rebound valve 28 chamber. The chamber 48 of the rebound valve connector 32 is fluidly connected to the orifice 52 in the third tube 40. The chamber 50 of the compression valve connector 34 extends through the compression valve connector 34 and fluidly connects the compression valve 30 and the chamber 50 of the compression valve 30. The chamber 50 of the compression valve connector 34 is fluidly connected to the orifice 54 in the fourth tube 42. In the example shown in the Figures, the rebound valve connector 32 and the compression valve connector 34 are each cylindrical with the chamber 48, 50 extending along the cylinder axis.

The rebound valve connector 32 is between the third tube 40 and the rebound valve 28, and the compression valve connector 34 is between the fourth tube 42 and the rebound valve 28. The rebound valve connector 32 may be mounted directly to the third tube 40 and the rebound valve 28, i.e., without any component between the third tube 40 and the rebound valve connector 32 and without any component between the rebound valve 28 and the rebound valve connector 32. As another example, the damper assembly 10 may include additional components between the rebound valve connector 32 and the third tube 40 and/or the rebound valve 28. The compression valve connector 34 may be mounted directly to the fourth tube 42 and the compression valve 30, i.e., without any component between the fourth tube 42 and the compression valve connector 34 and without any component between the compression valve 30 and the compression valve connector 34. As another example, the damper assembly 10 may include additional components between the compression valve connector 34 and the fourth tube 42 and/or the compression valve 30.

Figure 3:
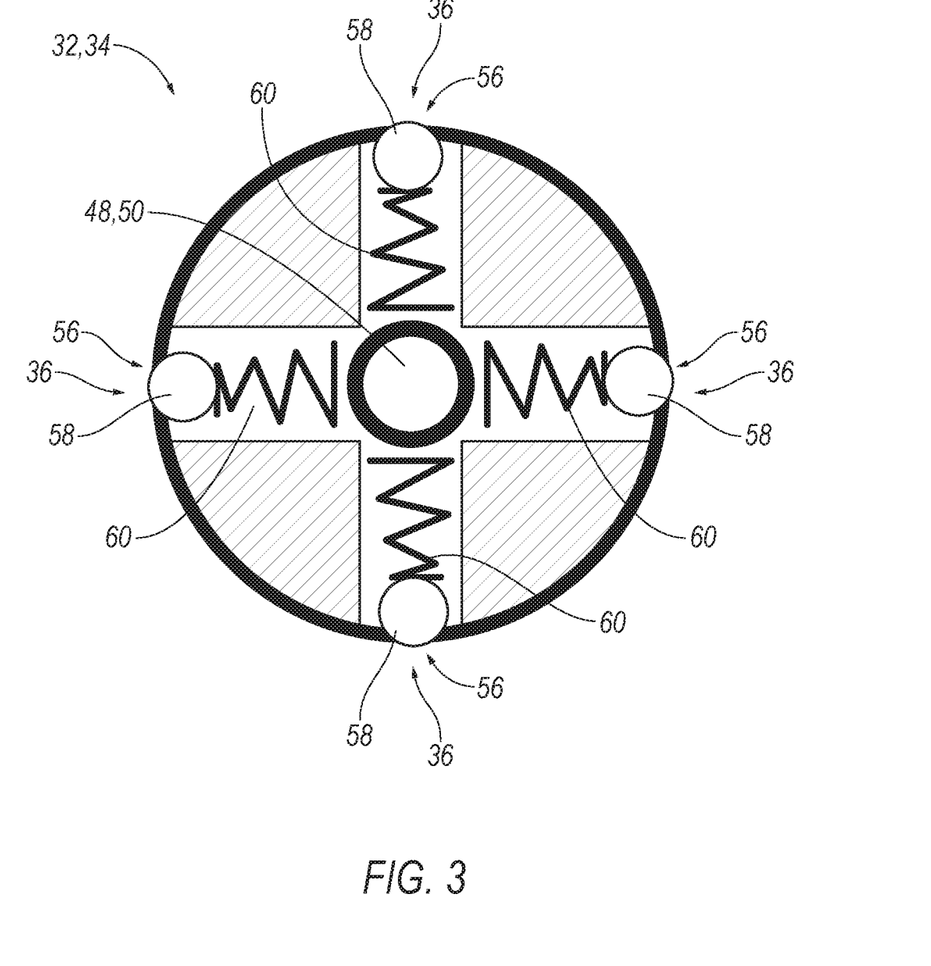
FIG. 3 is a cross-sectional view of a connector of the damper assembly.

The rebound valve connector 32 and the compression valve connector 34 each include a one-way valve 36 from the reserve chamber 18 to the chamber 48, 50 of the connector 32, 34. The one-way valve 36 of the rebound valve connector 32 provides fluid communication from the reserve chamber 18 to the rebound working chamber 24 through the third tube 40. The one-way valve 36 of the compression valve connector 34 provides fluid communication from the reserve chamber 18 to the compression working chamber 26 through the fourth tube 42. The one-way valve 36 of the rebound valve connector 32 prevents fluid flow from the chamber 48 to the reserve chamber 18, and the one-way valve 36 of the compression valve connector 34 prevents fluid flow from the chamber 50 to the reserve chamber 18. The connector 32, 34 may include any suitable number of one-way valves 36. In the example shown in FIGS. 3A-3B, the connector includes four one-way valves 36. In the example shown in the Figures, the one-way valves 36 of the rebound valve connector 32 and the compression valve connector 34 are of the same construction. Common numerals are used to identify the one-way valves 36 of the rebound valve connector 32 and the compression valve connector 34.

The one-way valve 36 may be spring-loaded. For example, the one-way valve 36 may include an orifice 56, a head 58 sized to block the orifice 56, and a spring 60 biasing the head 58 toward the orifice 56. The spring 60 has a spring constant that allows pressure above a threshold to compress the spring 60 via the head 58 to allow fluid flow from the reserve chamber 18 to the chamber 48, 50. The head 58 may be a ball, as shown in the example in the Figures.

The piston 22 may include a passive valve 62 configured to allow one-way flow from the rebound working chamber 24 to the compression working chamber 26. The passive valve 62 is a one-way valve allowing fluid flow from the rebound working chamber 24 to the compression working chamber 26 during rebound and preventing fluid flow from the compression working chamber 26 to the rebound working chamber 24. The passive valve 62 includes a biasing element (not numbered), for example a spring plate or a plurality of spring plates, and an associated passage (not numbered) through a head of the piston 22. Pressure in the rebound working chamber 24 overcomes the biasing element and opens the biasing element to allow fluid flow from the rebound working chamber 24 to the compression working chamber 26 when pressure in the rebound working chamber 24 exceeds a pressure threshold. The biasing element opens the head 58 of the piston 22 and the passive valve 62 move as a unit during rebound and compression.

The damper assembly 10 may include a passive valve 64 between the compression working chamber 26 and the reserve chamber 18. The passive valve 64 is a one-way valve allowing fluid flow from the compression working chamber 26 to the reserve chamber 18 during compression and preventing fluid flow from the reserve chamber 18 to the compression working chamber 26. The passive valve 64 includes a biasing element (not numbered), for example a spring plate or a plurality of spring plates, and an associated passage (not numbered) from the compression working chamber 26 to the reserve chamber 18. Pressure in the compression working chamber 26 overcomes the biasing element and opens the biasing element to allow fluid flow from the compression working chamber 26 to the reserve chamber 18 when pressure in the compression working chamber 26 exceeds a pressure threshold.

FIG. 4 shows the flow path for a rebound stroke. Movement of the piston 22 and fluid flow is identified by arrows in FIG. 4. In a rebound stroke, the piston 22 moves away from the compression working chamber 26 and the fluid is pressurized in the rebound working chamber 24. The rebound valve 28 is selectively opened, in which case fluid is forced from the rebound working chamber 24, through the orifice 44, through the third tube 40, through the orifice 52 and the chamber 48, and past the rebound valve 28. This pressurizes the reserve chamber 18 and, when pressurized to a pressure to overcome the one-way valve 36 in the compression valve connector 34, fluid flows through the one-way valve 36 in the compression valve connector 34, through the chamber 50 and orifice 54, through the fourth tube 42, and through the orifice 46 to the compression working chamber 26. During this fluid flow, fluid may also flow through the passive valve 60 when pressure in the rebound working chamber 24 is sufficient to overcome the biasing element of the passive valve 60.

FIG. 5 shows the flow path for a compression stroke. Movement of the piston 22 and fluid flow is identified by arrows in FIG. 5. In the compression stroke, the piston 22 moves toward the compression working chamber 26 and the fluid is pressurized in the compression working chamber 26. The compression valve 30 is selectively opened, in which case fluid is forced from the compression working chamber 26, through the orifice 46, through the fourth tube 42, through the orifice 54 and the chamber 50, and past the compression valve 30. This pressurizes the reserve chamber 18, and when pressurized to a pressure to overcome the one-way valve 36 in the rebound valve connector 32, fluid flows through the one-way valve 36 in the rebound valve connector 32, through the chamber 48 and orifice 52, through the third tube 40, and through the orifice 44 to the rebound working chamber 24. During this fluid flow, fluid may also flow through the passive valve 62 when pressure in the compression working chamber 26 is sufficient to overcome the biasing element of the passive valve 62.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A damper assembly, comprising:
an outer tube;
an inner tube disposed in the outer tube defining a reserve chamber between the outer tube and the inner tube, the inner tube defining an inner volume;
a piston slidably disposed in the inner tube, the piston dividing the inner volume of the inner tube into a rebound working chamber and a compression working chamber; and
a rebound valve fluidly connected to the rebound working chamber and the reserve chamber, the rebound valve having a variable flow resistance;
a compression valve fluidly connected to the reserve chamber and the compression working chamber, the compression valve having a variable flow resistance;
a rebound valve connector fluidly connecting the rebound valve and the rebound working chamber, the rebound valve connector including a one-way valve from the reserve chamber to the rebound working chamber; and
a compression valve connector fluidly connecting the compression valve and the compression working chamber, the compression valve connector including a one-way valve from the reserve chamber to the compression working chamber;
the rebound valve connector includes a chamber, the chamber of the rebound valve connecting being fluidly connected to the rebound working chamber and the rebound valve;
the compression valve connector includes a chamber, the chamber of the compression valve connector being fluidly connected to the compression working chamber and the compression valve.

2. The damper assembly of claim 1, wherein the one-way valve of the rebound valve connector and the one-way valve of the compression valve connector are spring-loaded.

3. The dampener assembly of claim 1, wherein the one-way valve of the rebound valve connector and the one-way valve of the compression valve connector each include an orifice, a head sized to block the orifice, and a spring biasing the head toward the orifice.

4. The dampener assembly of claim 3, wherein the head is a ball.

5. The damper assembly of claim 1, wherein:
the one-way valve of the rebound valve connector is between the reserve chamber and the chamber of the rebound valve connector; and
the one-way valve of the compression valve connector is between the reserve chamber and the chamber of the rebound valve connector.

6. The damper assembly of claim 5, further comprising a third tube and a fourth tube fixed to the inner tube between the inner tube and the outer tube, the third tube being fluidly connected to the rebound working chamber and the chamber of the rebound valve connector, and the fourth tube being fluidly connected to the compression working chamber and the chamber of the compression valve connector.

7. The damper assembly of claim 1, further comprising a third tube and a fourth tube fixed to the inner tube between the inner tube and the outer tube, the third tube fluidly connecting the rebound working chamber and the rebound valve, and the fourth tube fluidly connecting the compression working chamber and the compression valve.

8. The dampener assembly of claim 1, further comprising a passive compression valve between the compression working chamber and the reserve chamber.

9. The dampener assembly of claim 1, wherein the piston includes a passive rebound valve configured to allow one-way flow from the rebound working chamber to the compression working chamber.

10. A damper assembly, comprising:
an outer tube;
an inner tube disposed in the outer tube defining a reserve chamber between the outer tube and the inner tube, the inner tube defining an inner volume;
a piston slidably disposed in the inner tube, the piston dividing the inner volume of the inner tube into a rebound working chamber and a compression working chamber; and
a rebound valve fluidly connected to the rebound working chamber and the reserve chamber, the rebound valve having a variable flow resistance;
a compression valve fluidly connected to the reserve chamber and the compression working chamber, the compression valve having a variable flow resistance;
a rebound valve connector having a chamber fluidly connecting the rebound valve and the rebound working chamber;
the rebound valve connector including a ball, an orifice between the reserve chamber and the chamber of the rebound valve connector, and a spring biasing the ball of the rebound valve connector toward the orifice of the rebound valve connector; and
a compression valve connector having a chamber fluidly connecting the compression valve and the compression working chamber;
the compression valve connector including a ball, an orifice between the reserve chamber to the chamber of the of the compression valve connector, and a spring biasing the of the compression valve connector toward the orifice of the compression valve connector.

11. The damper assembly of claim 10, further comprising a third tube and a fourth tube fixed to the inner tube between the inner tube and the outer tube, the third tube being fluidly connected to the rebound working chamber and the chamber of the rebound valve connector, and the fourth tube being fluidly connected to the compression working chamber and the chamber of the compression valve connector.

12. The dampener assembly of claim 10, further comprising a passive valve between the compression working chamber and the reserve chamber.

13. The dampener assembly of claim 10, wherein the piston includes a passive rebound valve configured to allow one-way flow from the rebound working chamber to the compression working chamber.

* * * * *

UNITED STATES PATENT AND TRADEMARK OFFICE
CERTIFICATE OF CORRECTION

PATENT NO. : 11,434,971 B2
APPLICATION NO. : 17/007948
DATED : September 6, 2022
INVENTOR(S) : Alexander Alvarez Cendoya It is certified that error appears in the above-identified patent and that said Letters Patent is hereby corrected as shown below:

In the Claims

Column 8, in Lines 46 and 47, Claim 10 replace "reserve chamber to the chamber of the of the compression valve" with -- reserve chamber to the chamber of the compression valve --.

Signed and Sealed this
Fourteenth Day of November, 2023

Katherine Kelly Vidal
*Director of the United States Patent and Trademark Office*